Dec. 22, 1970   W. R. HOLMAN   3,548,646
TENSILE TEST APPARATUS
Filed Feb. 28, 1969
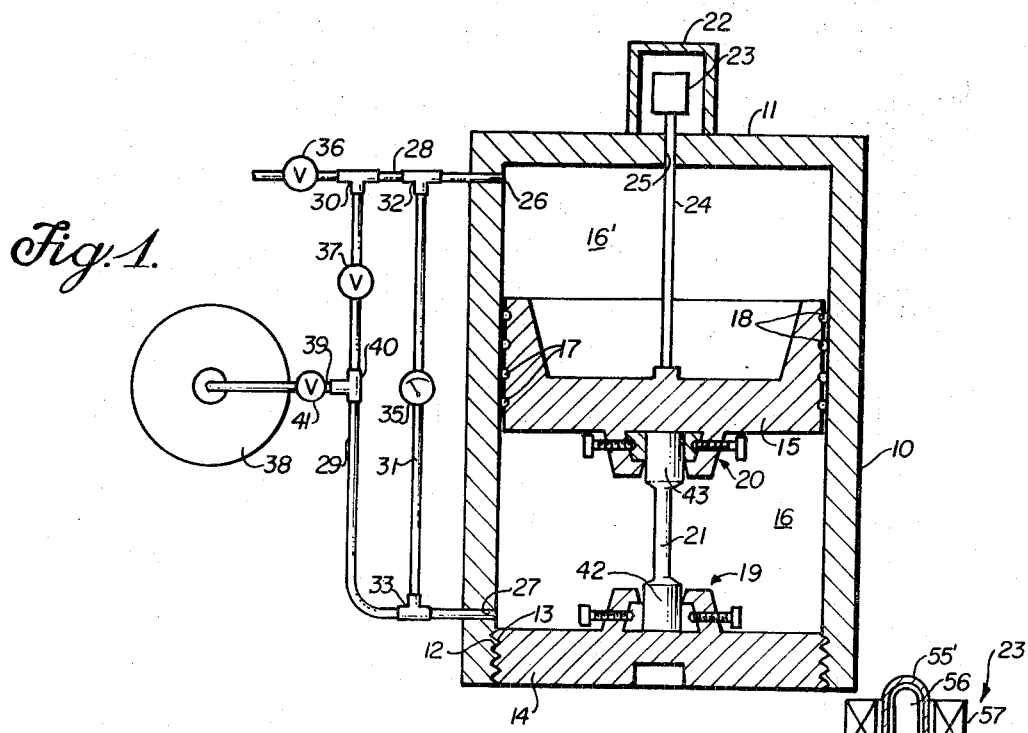
Fig. 1.
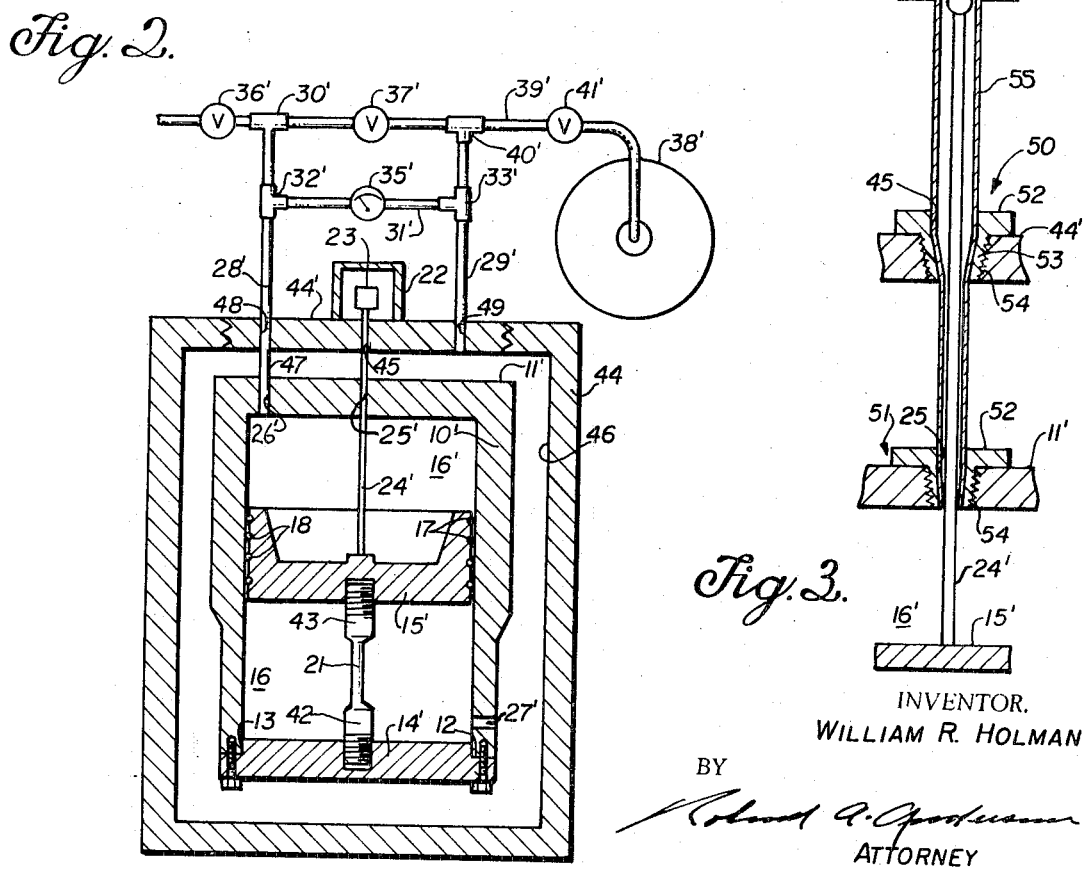
Fig. 2.
Fig. 3.
INVENTOR.
WILLIAM R. HOLMAN
BY
ATTORNEY

United States Patent Office 3,548,646
Patented Dec. 22, 1970

3,548,646
TENSILE TEST APPARATUS
William R. Holman, Danville, Calif., assignor to the United States of America as represented by the United States Atomic Energy Commission
Filed Feb. 28, 1969, Ser. No. 803,154
Int. Cl. G01n 3/10
U.S. Cl. 73—97                10 Claims

ABSTRACT OF THE DISCLOSURE

A tensile testing apparatus for measuring mechanical properties of a specimen under the influence of high pressure gaseous or liquid environments. The apparatus comprises a cylindrical enclosure with a piston therein dividing the volume thereof into two compartments. A test specimen is clamped between one side of the piston and the end of the enclosure. Pressurized gas is directed to both compartments and then allowed to escape from one, the mechanical effect on the specimen being determined from the measurement of the differential pressure between compartments and the displacement of the piston. The cylindrical enclosure may be hermetically sealed with the walls thereof of sufficient thickness to withstand the high pressures involved, but preferably located within a high pressure vessel or autoclave of a commercially available type.

BACKGROUND OF THE INVENTION

The invention described herein was made in the course of, or under, Contract No. W-7405-ENG-48, with the United States Atomic Energy Commission.

The mechanical properties of many metals and alloys are affected by the atmospheric environment, notably the gases hydrogen, oxygen, etc. Little is quantitatively known about the relation between gas pressure and length of exposure to a gas and the mechanical properties of alloys. Therefore, considerable metallurgical investigative effort has been directed toward collecting data concerning the environment pressure dependence of the mechanical properties of a wide variety of materials.

SUMMARY OF THE INVENTION

The present invention significantly facilitates investigations to provide further knowledge and technology of metals and alloys sensitive to hydrogen and helium environments, for example. In addition, the inventive apparatus can be generally used for tasks normally performed by the conventional tensile testing machines.

Therefore, it is an object of this invention to provide an improved tensile testing apparatus.

A further object of the invention is to provide a tensile test apparatus for measuring the mechanical properties of a specimen under the influence of high pressure gaseous or liquid environments.

A further object of the invention is to provide a tensile testing apparatus which utilizes a pressure actuated piston and wherein the effect on the specimen is determined from the measurement of the differential pressure across the piston and the displacement thereof.

Other objects of the invention will become readily apparent from the following description and accompanying drawings.

BRIEF DESCRIPTION OF THE DRAWINGS

FIG. 1 is a view, partially in cross-section, of a first embodiment of the inventive apparatus;

FIG. 2 is a partial cross-sectional view of a preferred embodiment of the invention; and FIG. 3 is a partial diagrammatic view of the linear differential transformer utilized to measure piston displacement in the FIGS. 1 and 2 embodiments.

DESCRIPTION OF THE INVENTION

The embodiment of the tensile test apparatus illustrated in FIG. 1 comprises a thick walled cylindrical vessel or housing 10 having a closed end 11 and an open end having threads 12 thereon to receive threads 13 of a lid or closure member 14 in a hermetically sealed relationship. The wall structure of the housing 10 and closure member 14 must be made of a material and thickness suitable to withstand the high pressures involved, for example, 10,000 p.s.i.a. Also, if needed, appropriate seals would be utilized adjacent threads 12 and 13, or other sealing means having sufficient mechanical joint strength. A piston 15 is positioned within the cylindrical housing 10 and divides the interior or volume thereof into compartments indicated at 16 and 16'. A plurality of ring members 17, such as piston rings or O-rings, positioned in grooves 18 around piston 15 hermetically separate compartments 16 and 16'. In certain amplifications, a single ring member 17 may be sufficient. A pair of clamping assemblies 19 and 20 are respectively mounted on the internal surface of closure member 14 and the adjacent surface of piston 15. A test specimen 21 is securely held in compartment 16 by the clamping assemblies 19 and 20, or secured therein as illustrated in the FIG. 2 embodiment. A housing 22 containing a linear differential transformer or transducer assembly 23, or other motion measuring device as known in the art, is externally mounted on the closed end 11 of housing 10, with an actuator member or rod 24 thereof extending through an appropriately sealed aperture 25 in housing 10 and in contact with or secured to the piston 10 on the side thereof opposite clamping assembly 20, actuator member 24 functioning to actuate linear transducer assembly 23 upon movement of piston 10. Transducer assembly 23 is hereinafter described in greater detail with respect to FIG. 3.

Cylindrical housing 10 is provided with a pair of fluid passages 26 and 27 respectively adjacent the closed end 11 and the open end containing threads 12. While not shown, passages 26 and 27 may, if desired, be provided with high pressure pass-through plug elements similar to that illustrated in FIG. 3. A first conduit 28 is secured to housing 10 and in fluid communication with passage 26, while a conduit 29 is secured to housing 10 for fluid communication with passage 27, conduit 29 being connected at 30 to conduit 28. A conduit 31 interconnects conduits 28 and 29 at a point between fluid passages 26–27 and interconnection 30, as respectively indicated at 32 and 33, a pressure gauge 35 or other known pressure differential indicating mechanism being operatively mounted in conduit 31 for purposes described hereinafter. A valve assembly 36 is positioned in conduit 28 at a point outwardly from interconnection 30 such that both conduits 28 and 29 can direct fluid therethrough from compartments 16 and 16' subject to a valve assembly 37 in conduit 29 being open. A fluid pressure source 38 is connected via a conduit 39 to conduit 29 as indicated at 40, a valve assembly 41 being positioned in conduit 39, interconnection 40 being intermediate valve assembly 37 and interconnection 33.

It should again be noted that the material and thickness of housing 10 and closure member 14 is dependent on the pressures involved, and need be such that internal pressure therein will not cause bulging and leakage past piston 15. Also, piston 15 can be configured as shown or otherwise configured to provide the desired surface area such that the pressure, of the fluid environment under investigation, applied to this area will exert a force sufficient to stress the specimen to the desired level (lower stresses of any level can then be applied by counteracting this with an opposing pressure on the reverse side of the piston; i.e., slowly reducing or releasing the pressure by "cracking" the valve assembly 36 which has the effect of slowly increasing the stress on the specimen). This stress versus the change in length as measured by the LDT constitute the test results. In addition, the apparatus is used for stress rupture tests in which a constant stress is applied and the time for failure thereof is recorded.

To operate the test apparatus of FIIG. 1, with the specimen 21 clamped at ends 42 and 43 thereof in clamping assemblies 19 and 20, as shown, compartment 16 and 16' are pressurized to the desired maximum gas pressure from source 38 by closing valve assembly 36 and opening valve assemblies 37 and 41 allowing fluid under pressure to flow from source 38 via conduits 39 and 28–29 and passages 26 and 27 into the compartments 16 and 16'. After the test specimen 21 has been held under the influence of the environmental gas, such as hydrogen, helium, oxygen, etc., for a desired length of time, the stress-strain rleationships of the material under the influence of the environment can be ascertained by closing valve assembly 37 and opening valve assembly 36 releasing pressure from compartment 16', whereby pressure differential indicated by gauge 35, between compartments 16 and 16' is established. Valve assembly 36 is opened slowly so pressure difference and therefore stress on the specimen increases at a desired rate; i.e., slowly in a normal test but possibly at a rapid rate depending on the type of test. The pressure differential, measured by gauge 35 between compartments 16 and 16', provides data from which the force on the test specimen can be calculated. The extension of the test specimen 21 as indicated by movement of actuator member 24 is measured by sensing the motion of the member 24 by the linear transducer or differential transformer 23, or other conventionally known motion measuring devices. If desired, both the differential pressure across the piston 15 and elongation of the specimen 21 can be recorded simultnaeously by a XY recorder, not shown, known in the art.

The preferred embodiment of FIG. 2 differs from the above described FIG. 1 embodiment primarily in the simplified construction of the housing 10' by positioning the cylindrical housing 10' in a high pressure autoclave or vessel 44 having a hermetically sealed end member 44' and rearrangement of the fluid passages therein for connection to the previously described conduit arrangement, valve assemblies, prsesure source, etc. Like components will be given similar reference numerals to those described above with respect to the FIG. 1 embodiment. The cylindrical housing 10' is provided with a closed end 11' and at the other end is closed by a lid or closure 14' secured thereto by bolts or other such means. Housing 10' and lid 14' is of a relatively thin wall construction compared to the thickness of the housing 10 of FIG. 1 and that of the vessel or autoclave 44. This is due to the pressure differential across a portion of the wall surfaces of the housing 10' because of its location within the autoclave 44. Actually there is zero pressure differential across the wall of housing 10' except in the region where this wall surrounds the small volume 16', and then only when a pressure difference exists between compartments 16 and 16'. Compartment 16 and the interior of autoclave 44 are always at the same pressure and thus no stress due to pressure differences across the wall therebetween can develop. The only requirement of housing and closure member strength and thickness is that the pressure differential thereacross will not change the clearance between the wall of housing 10' and piston 15', with the closure member 14' being of sufficient strength to maintain the end of the test specimen in fixed position during the testing operation. Note that the portion of housing 10' confining piston 15' and compartment 16' is of a thicker wall construction than the remainder thereof to compensate for the pressure differential thereacross when the high pressure fluid is partially released from chamber 16' during the testing operation. A piston 15' divides the interior of housing 10' into compartments 16 and 16', piston 15' being provided with one or more O-rings or sealing rings 17 located in groove 18 to hermetically separate compartments 16 and 16'. Since compartment 16 is in fluid communication with autoclave 44, closure member 14' is not hermetically sealed. Test specimen 21 is threaded at the ends 42 and 43 thereof which are threaded into lid 14' and piston 14' thereby fixedly securing the specimen 21 within chamber 16. A housing 22 containing a linear differential transformer or transducer 23 is mounted externally of autoclave 44 and the actuator member 24' of the differential transformer or transducer 23 extends through an appropriately sealed aperture 45 in autoclave 44, as illustrated in greater detail in FIG. 3, and an appropriately sealed aperture 25 in housing 10', and is in contact with or secured to piston 15' for movement therewith. A fluid passage 27' interconnects compartment 16 with the interior 46 of autoclave 44. Passage 27' may, if desired, comprise a small groove on the end face of housing wall 10' where closure member 14' mates therewith to assure rapid flow between compartment 16 and autoclave interior 46 so that no pressure difference can develop. A conduit 47 interconnects a fluid passage 26' in housing 10' with a fluid passage 48 in autoclave end member 44'. A conduit 28' interconnects autoclave end member 44' about passage 48 so as to be in fluid communication with compartment 16' via passage 48, conduit 47 and passage 26'. A conduit 29' is secured to end member 44' of autoclave 44 at a fluid passage 49 thereby being in fluid communication with compartment 16 via passage 49, autoclave interior 46 and passage 27', conduit 29' interconnecting with conduit 28' at 30'. As pointed out above, and if desired, each of the passages 26', 48 and 49 may be provided with a high pressure pass-through plug element similar to that shown in FIG. 3. A conduit 31' interconnects conduits 28' and 29' at connections 32' and 33', respectively, with a pressure gauge 35' positioned therein. Conduit 28' is provided with a valve assembly 36', while conduit 29' contains a valve assembly 37'. A fluid pressure source 38' is connected via conduit 39' to conduit 29' at 40', conduit 39' containing a valve assembly 41'.

It is thus seen that the FIG. 2 embodiment is greatly simplified over the FIG. 1 embodiment and consists of three subassemblies; namely, the housing, the piston and the linear differential transformer, all operatively positioned in or on a conventional high pressure autoclave having a removably sealed end cover or lid.

The operation of the FIG. 2 embodiment is substantially the same as that of the FIG. 1 embodiment, except that the compartment 16 containing specimen 21 is in fluid communication with the volume or interior 46 of the autoclave 44 and not directly with the pressure source 38' as previously described. Thus, the FIG. 2 apparatus is a complete tensile testing apparatus which operates completely inside of a high pressure vessel or autoclave, using the available "stored energy" of the autoclave to supply the work necessary to stress and elongate the specimen.

The linear differential transformer or transducer assembly 23 of the type utilized in the FIG. 1 and FIG. 2 embodiments is illustrated in greater detail in FIG. 3, the specific embodiment shown in FIG. 3 being directed to the FIG. 2 apparatus. Secured in each of the apertures 25 and 45 in housing end 11' and autoclave end member 44' is a high pressure pass-through plug mechanism generally indicated at 50 and 51, respectively. Each of the plug mechanisms 50 and 51 having a head portion 52 and a tapered shank portion 53 having external threads which cooperate with threads in the apertures 25 and 45, the lower end of shank portion 53 being provided with packing or sealing means 54. A high pressure tube 55, closed at one end, extends through each of plug mechanisms 50 and 51 with the closed end 55' thereof external to end member 44' and the open end terminating in aperture 25 of housing end 11', thereby being in fluid communication with compartment 16'. Actuator member 24' secured to or in contact with piston 15' extends into tube 55, the free end thereof being provided with a feromagnetic end section or portion 56, constituting the core thereof, which is located adjacent closed tube end portion 55' externally of autoclave end member 44'. Positioned around the core or end section 56 of actuator 24' is a coil assembly generally indicated at 57 which is electrically connected, but not shown, and as known in the art, to actuate a gauge or other indicating means. Thus, movement of piston 15' causes core or end section 56 of actuator 24' to be moved accordingly and movement of the magnetic material thereof through said coil causes actuation thereof corresponding to the amount of movement of section 56 therethrough, thus giving an indication of the amount of movement of piston 15' which corresponds to the increased length of the specimen undergoing test. The linear differential transformer 23 is conventionally known in the art, and great discussion of the details thereof is deemed unnecessary.

The inventive concept described above has been extensively and successfully tested and serves to further the knowledge and technology of metals and alloys sensitive to gaseous environments, such as hydrogen and helium. In addition, the inventive apparatus has demonstrated its value as a tensile testing device for general metallurgy applications.

Although specific embodiments of the invention have been illustrated and described, modifications will become apparent to those skilled in the art, and it is intended to cover all such modifications as come within the true spirit and scope of the invention.

What is claimed is:

1. An apparatus for measuring the elongation of a test specimen in high pressure environments comprising: a housing having at least one removable end portion and an interior wall surface defining a cavity therein, piston means positioned in said cavity and in a hermetically sliding relationship with said interior wall surface of said housing, said piston means separating said cavity into a pair of compartments, means in one of said pair of compartments adapted to rigidly secure an associated test specimen between said piston means, said removable end portion of said housing, means for measuring the displacement of said piston means mounted on said housing and operatively mounted to be moved by said piston means, said housing including a pair of passage means providing for fluid communication between said pair of compartments and the exterior of said housing, conduit means adapted to supply fluid from an associated pressurized fluid source to each of said passage means of said housing, valving means positioned in said conduit means for selectively directing pressurized fluid through said conduit means into each of said compartments and selectively allowing pressurized fluid to escape from at least one of said compartments, whereby said piston means is displaced by pressurized fluid in the other of said pair of compartments, and pressure indicating means interconnecting said pair of compartments for measuring pressure difference between said compartments.

2. The apparatus defined in claim 1, wherein said at least one removable end portion comprises a closure member having threads about the periphery thereof, said closure member being threadedly secured in a threaded opening in one end of said housing and providing a hermetical seal therebetween.

3. The apparatus defined in claim 1, wherein said piston means, includes a piston member having at least one groove extending around the periphery thereof, and sealing means operatively mounted in said groove and cooperating with said interior wall surface of said housing to form a movable seal therebetween.

4. The apparatus defined in claim 1, wherein said conduit means comprises a first conduit secured to said housing and in fluid communication with one of said pair of passage means, a second conduit secured to said housing and in fluid communication with the other of said pair of passage means, said second conduit being interconnected in fluid communication with said first conduit, and a third conduit connected in fluid communication with said second conduit and adapted to be connected to an associated pressurized fluid source.

5. The apparatus defined in claim 4, wherein said pressure indicating means is operatively positioned in a fourth conduit, said fourth conduit being connected for fluid communication intermediate said first and second conduits.

6. The apparatus defined in claim 4, wherein said valving means comprises a first valve assembly operatively positioned in said first conduit, a second valve assembly operatively positioned in said second conduit at a point intermediate the interconnections of said second conduit with first and third conduits, and a third valve assembly operatively positioned in said third conduit.

7. The apparatus defined in claim 1, wherein said piston displacement measuring means comprises a linear differential transformer assembly having an actuator member operatively associated with said piston means for movement thereby.

8. The apparatus defined in claim 1, additionally including a high pressure autoclave surrounding said housing, said autoclave being provided with a pair of passageways, said conduit means being connected to said autoclave and in fluid communication with said passageways therein, and means for providing fluid interconnection between one of said autoclave passageways and one of said passage means in said housing.

9. The apparatus defined in claim 8, wherein said last mentioned means comprises a conduit operatively connected between said autoclave and said housing for fluid communication between said one of said autoclave passageways and said one of said passage means in said housing, said one of said passages in said housing being the passage means interconnecting the other of said pair of compartments with the exterior of said housing.

10. The apparatus defined in claim 1, additionally including a pressurized fluid source, said source being operatively connected to said conduit means and fluid therefrom being directed by said valving means, whereby said valving means is positioned to direct pressurized fluid from said source through said conduit means into both of said pair of compartments in said housing, after which said valving means is positioned to continue to direct pressurized fluid from said source to said one of said compartments while allowing a low flow rate escape from the other of said compartments, whereby the pressurized fluid in said one of said compartments tends to displace said piston means in a direction toward said other compartment for testing tensile strength of an associated test specimen adapted to be retained in said one compartment by said specimen securing means.

References Cited

UNITED STATES PATENTS 2,030,640   2/1936   Kinzel    73—97

FOREIGN PATENTS 1,067,298   6/1954   France    73—97

JERRY W. MYRACLE, Primary Examiner